United States Patent Office 3,310,186
Patented Mar. 21, 1967

3,310,186
VEHICLE LIFTING AND TOWING APPARATUS
Edward F. Wegener and Thure H. Wegener, both of S. River Road, Cranbury, N.J. 08512
Filed June 16, 1965, Ser. No. 464,275
10 Claims. (Cl. 214—86)

This invention relates to apparatus known as tow bars for lifting and towing disabled vehicles.

At the present time, one tow bar commonly used for lifting disabled vehicles includes a first upper horizontal bar, called a lifter bar, spaced from a second lower horizontal bar, called an anchor bar, and flexible means connected between the two bars. The flexible connecting means is usually a pair of chains or cables and/or a pair of slings of resilient material such as rubber, leather, or the like. The connecting cables or slings are used to cradle the disabled vehicle, that is, the wreck rests directly in contact with the cables or slings, and it has been considered necessary to provide both cables and slings for use as the particular situation requires. For example, when portions of the front end or rear end of the towed vehicle must be protected during the towing process, then the resilient slings are employed. If the end of the vehicle need not be protected, then the chains or cables can be employed. However, if the end of the vehicle to be raised is damaged and jagged pieces of metal protrude, then the chains must be used and the slings must not be used or they may be damaged. Thus, the wrecker operator must make a choice as to the equipment he will use in each case. It can be seen that tow bars of this type, which require a selection of slings or chains and/or removal of one to use the other, are relatively clumsy and time-consuming to use, and they are relatively expensive to manufacture. In addition, some operators, either due to carelessness or perhaps lack of time, will not bother to change from slings to chains or vice-versa as required.

Accordingly, the objects of the present invention concern the provision of improved towing apparatus of relatively simple construction and suitable for universal use with all disabled vehicles, regardless of the nature of the damage.

The objects of the invention also concern the provision of improved towing apparatus which can be properly coupled to a disabled vehicle with ease and can be easily adjusted to protect portions of the disabled vehicle as required.

Another object of the invention concerns the provision of an improved vehicle lifting and towing apparatus which makes minimal contact with the vehicle being towed and thus requires no elaborate means for protecting the vehicle being towed.

Briefly, lifting and towing apparatus embodying the invention includes a generally rectangular rigid frame which is adapted to be coupled to a lifting crane and is also adapted to be coupled through chains or cables or the like to the undercarriage of the vehicle to be towed, the wreck. In operation of the apparatus, the frame is placed in contact with the end of the wreck to be raised, and it is oriented at the desired elevation and angle with respect to the wreck so that the chains or cables can be coupled taut to the undercarriage or frame of the wreck behind the bumper and at a favorable distance beneath the wreck so that they are in contact with the wreck only at the point of connection to the undercarriage. In this way, the chains or cables cannot affect decorative portions of the wreck body.

Thus, the rectangular frame and chains or cables form a rigid V-shaped support in which the vehicle is wedged, by which the vehicle is raised, and which is in contact with the vehicle only at the undercarriage (by the chains) and over a limited area (by the rectangular frame) at the front or rear end, depending on which is to be raised. This portion of the rectangular frame of the tow bar may be provided with a protective resilient covering which protects the vehicle, whether or not it is necessary. By adjustment of the length of the connecting chain or cable, the angular position and location of the frame and the shape of the wedge, in which the vehicle is cradled, may be modified.

The invention is described in greater detail by reference to the drawing, wherein.

Figure 1:
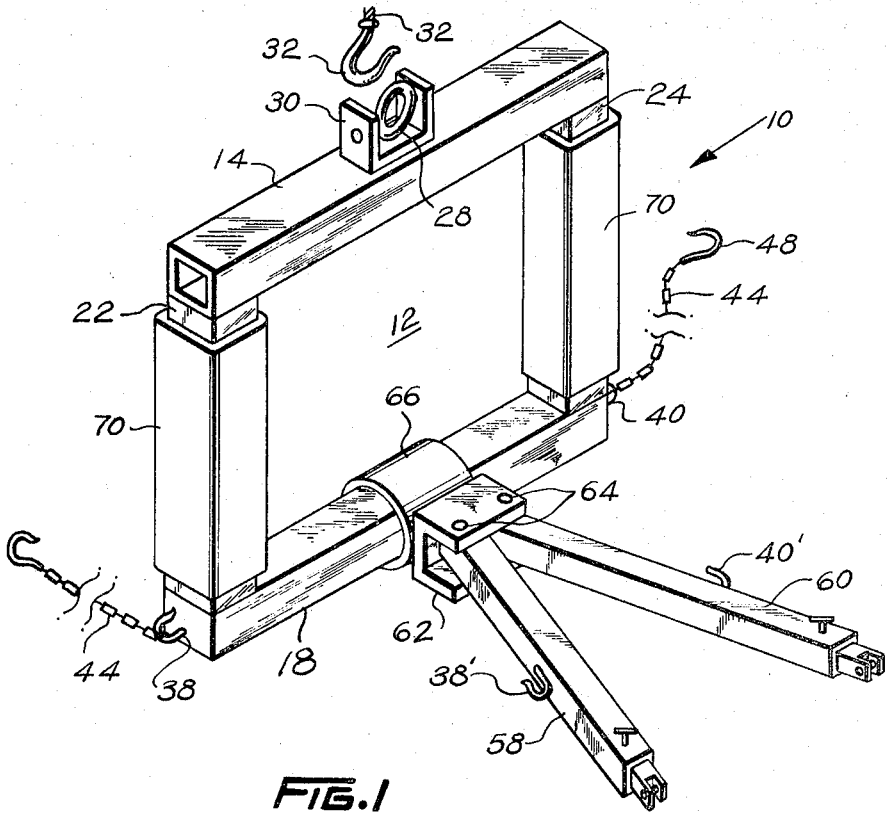
FIG. 1 is a perspective view of apparatus embodying the invention.
Figure 2:
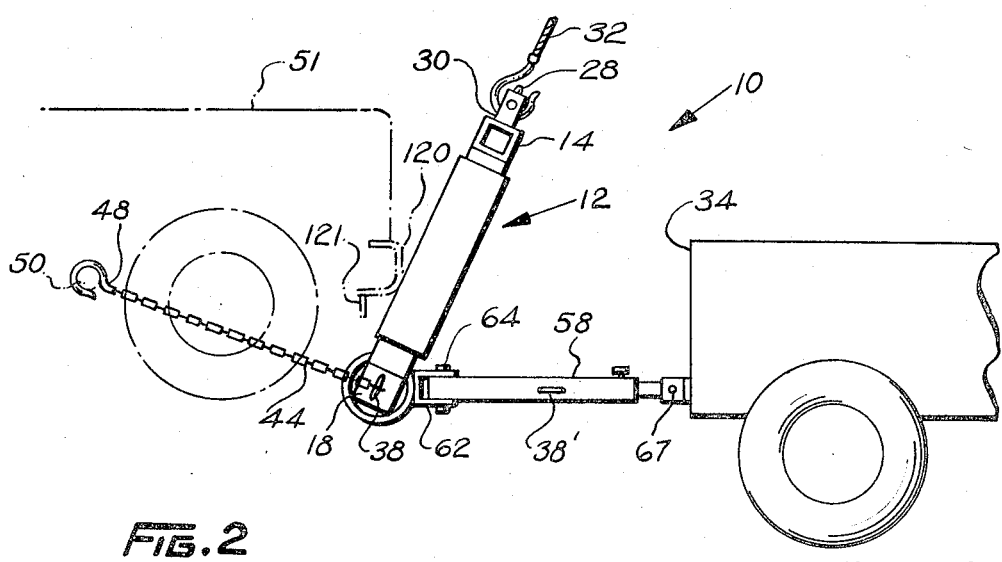
FIG. 2 is a side elevational view, partly in section, of the apparatus shown in FIG. 1 as it appears in use.

Referring to FIGS. 1 and 2, a tow bar 10 embodying the invention includes a generally rectangular rigid frame 12 of steel or the like which comprises an upper horizontal bar 14 and a lower horizontal bar 18 generally parallel thereto, with the upper and lower bars interconnected by parallel side members 22 and 24 oriented between aligned ends of the upper and lower bars. The upper bar carries an eye 28 pivotally supported thereon by means of a suitable U-shaped bracket 30 welded or otherwise secured to the upper bar. The eye is adapted to be engaged by a hook 32 which is coupled to a lifting crane on a towing vehicle or wrecker represented schematically by reference numeral 34.

The lower bar 18 carries at its ends a pair of grab hooks 38 and 40 which are used for connecting the tow bar 10 to the vehicle to be raised, otherwise known as the wreck. This connection may be made by means of elongated flexible chains or cables 44 which include at one end a hook 48 adapted to engage the undercarriage or frame 50 (FIG. 2) of the wreck 51. Each chain or cable is also adapted to be coupled by a hook or eye or by means of one of its links to one of the grab hooks 38 and 40 so that it can be held taut between the rigid frame 12 and the undercarriage 50.

The tow bar 10 also includes a pair of telescoping spacer bars 58 and 60 which are of well known construction and need not be described in intimate detail. The spacer bars are connnected as a V with the apex of the V pivotally secured to a bracket 62 by vertical pins 64 or the like and with bracket 62 secured to a sleeve 66 which is rotatably and slidably mounted on the lower bar 18. To accommodate the sleeve 66, either just the central portion or all of the lower bar may be generally cylindrical in shape. The opposite ends of the spacer bars are pivotally coupled to the tailgate of a wrecker 34, for example, by means of horizontal pins 67 so that they can pivot in a generally vertical plane.

Those skilled in the art will also see that the bracket 62 might be secured directly to lower bar 18, without sleeve 66, with the ends of the spacer bars 58 and 60 secured thereto by some type of universal coupling arrangement to permit movement in both horizontal and vertical planes.

In an alternative arrangement for coupling the tow bar 10 to a wreck, the bars 58 and 60 are provided with grab hooks 38' and 40' secured, preferably, to the outer or fixed members of the spacer bars, and the chains 44 are coupled between the wreck undercarriage 50 and hooks 38' and 40' without contacting hooks 38 and 40. If desired, in this mode of connection, chains 44 may use hooks 38 and 40 as guides as they extend between the undercarriage 50 and hooks 38' and 40'.

The vertical side members 22 and 24 are preferably covered with sleeves 70 of protective material, for example, of rubber, fabric, or the like, to protect the wreck even though the side members make contact with the wreck over a minimal area, as will be described below. The sleeves may be one-piece tubes tubes which are slipped over side members 22 and 24 before they are welded to members 14 and 18, or they may be sheets which are wrapped around members 22 and 24 and held in place by ties, snaps, or any suitable fasteners (not shown).

Figure 3:
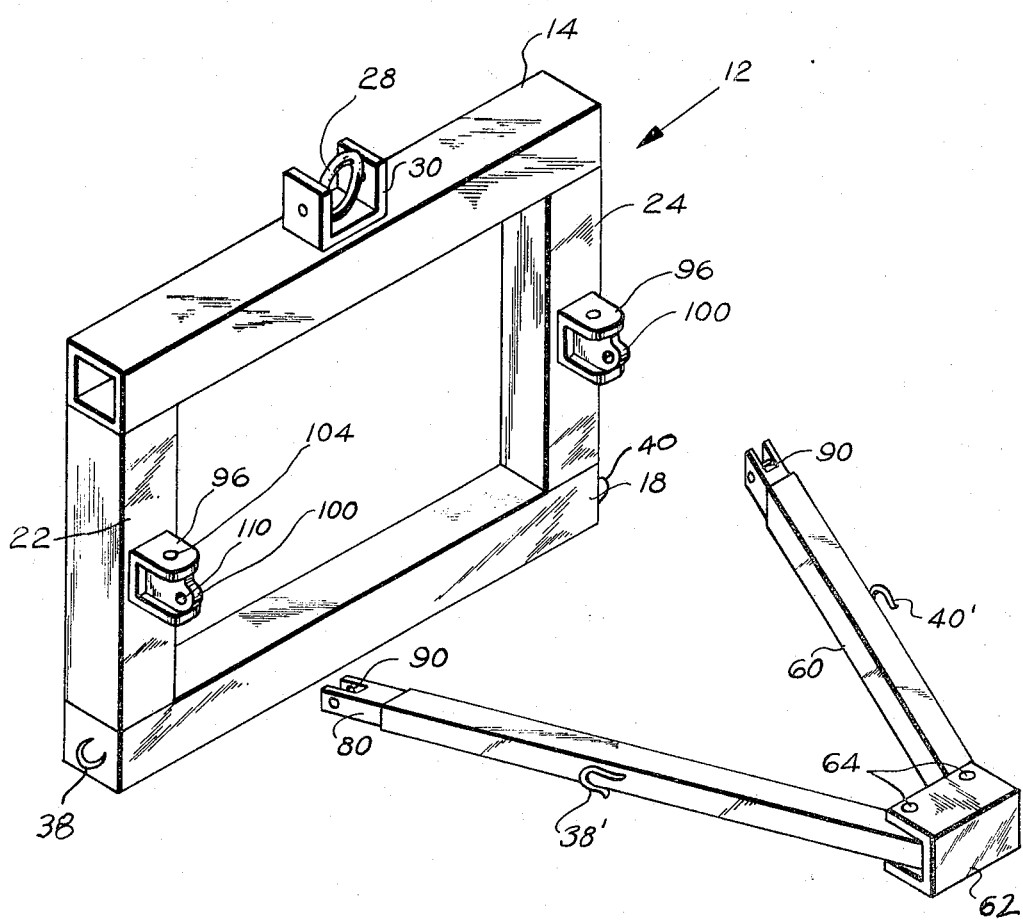
FIG. 3 is a perspective view of a modification of a portion of the apparatus of FIG. 1.

In another embodiment of the invention shown in FIG. 3, the spacer bars 58 and 60 are reversed, and bracket 62 and the joined ends of bars 58 and 60 are secured to the tailgate of the wrecker, and the other free ends of the bars are secured to the side members 22 and 24 of the rigid frame 12. Preferably, this latter connection is made just below the centers of the side members 22 and 24, and it includes connections which permit these ends of the spacer bars to pivot both vertical and horizontal planes. In one suitable arrangement for effecting this connection, the end of each spacer bar remote from bracket 62 is provided with a bracket 80 and a horizontal pin 90, and each side arm is provided with a bracket 96 to which is pivotally secured a tongue 100 by means of vertical pin 104. Tongue 100 includes an aperture 110 in which the pin 90 at the end of the appropriate spacer bar is positioned. Any other suitable coupling arrangement may also be employed to provide the desired pivoting action.

With respect to the spacer bars, generally, it is a matter of choice as to whether the inner or outer members are connected to the wreck or the wrecker. However, the auxiliary grab hooks 38' and 40' should be secured to the outer members, and the outer members should be connected to the rigid frame 12.

In operation of the tow bar 10 as shown in FIG. 1 or FIG. 3, usually, the telescoping spacer bars 58 and 60 are expanded to their maximum length and the tow bar is positioned so that the rectangular rigid frame 12 abuts the bumper 120 of wreck 51 (FIG. 2) at about, or just below, the centers of the side members 22 and 24. In this position, the frame 12 extends above and below the bumper, and it is tilted at an angle to the wreck with the upper bar forward and the lower bar rearward. The tow bar is thus also suitably positioned vertically so that the lower bar 18 is positioned vertically beneath the bumper, and, when chains or cables 44 are connected taut between the grab hooks 38 and 40 (or 38' and 40') and the wreck undercarriage 50, they lie below all portions of the wreck and do not contact any portions thereof, particularly decorative portions, such as splash pans or the like, represented by numeral 121, which are to be protected. In the simplest and preferred arrangement with the tow bar of FIG. 1, chains 44 are connected taut between grab hooks 38 and 40 and the undercarriage of the wreck. With the tow bar of FIG. 3, in order to maintain the desired angular relation of the parts, chains 44 are connected taut between both grab hooks 38 and 40 and the undercarriage of the wreck. In addition, chains are connected taut between both grab hooks 38 and 38' and between grab hooks 40 and 40'. It can be appreciated that, with the tow bar thus connected, the vertical side members 22 and 24 are in contact with the bumper of the wreck and not with any fragile decorative members. In addition, it can be seen that the side members are in contact with the bumper over relatively small areas so that even the bumper is not subject to undue stress.

With the connection thus made, a lifting force applied through the eye 28 to the upper horizontal bar 14 and to frame 12 causes the vehicle 51 to be raised, and the spacer bars telescope together and lock together. As the wreck is raised, it is wedged in place between the side arms 22 and 24 of the rigid frame and the chains or cables 44, and the chains or cables serve to prevent the vehicle from moving forwardly and backwardly as it is towed. Thus, it can be seen that the tow bar of the invention can be used to lift and tow heavy vehicles while making minimal contact with the vehicle. It can also be seen that the tow bar 10 can be easily and quickly adjusted and connected to any vehicle, with maximum protection being provided for decorative portions of the vehicle.

What is claimed is:

1. Apparatus for lifting and towing a wreck having a bumper and decorative portions to be protected including
    a generally rectangular frame adapted to contact the bumper of the wreck and including top and bottom members and two side members all rigidly interconnected,
    coupling means secured to said top member of said frame for coupling said frame and the tow bar to a lifting crane for raising and lowering said frame and apparatus attached thereto, connecting means,
    a pair of grab hooks secured to said bottom member and adapted to be connected through the connecting means to the undercarriage of the wreck to be raised and towed without contacting other decorative and fragile portions of the wreck,
    said connecting means comprising a flexible chain or cable adapted to be connected taut between each grab hook on said frame and the undercarriage of said wreck with said frame being oriented at a selected angle and elevation with respect to said wreck so that said connecting means, grab hooks and bottom member are located entirely beneath the bumper of the wreck and out of contact with decorative portions of said wreck.

2. The apparatus defined in claim 1 and including rigid spacing means secured to said bottom member of said frame and adapted to be coupled to the towing vehicle.

3. The apparatus defined in claim 1 and including rigid spacing means secured to said side members of said frame and adapted to be coupled to the towing vehicle.

4. The apparatus defined in claim 1 and including rigid spacing means secured to said side members of said frame at about their centers and adapted to be coupled to the towing vehicle.

5. The apparatus defined in claim 1 and including a pair of rigid spacer bars, each having one end secured to one of said side members of said frame and each having its other end secured to a towing vehicle.

6. The apparatus defined in claim 1 and including rigid spacer means secured to said rigid frame and adapted to be coupled to a towing vehicle, and a pair of auxiliary grab hooks secured to said rigid spacer means and adapted to permit said flexible cable connecting means to be coupled between said auxiliary grab hooks and the undercarriage of the wreck.

7. The apparatus defined in claim 1 and including a pair of rigid telescoping spacer bars secured to said rigid frame at one end and adapted to be coupled to a towing vehicle at the opposite end, and an auxiliary grab hook secured to each spacer bar, said flexible connecting chains or cables being adapted to be secured between said auxiliary grab hooks and the undercarriage of the wreck.

8. The apparatus defined in claim 1 and including a pair of rigid telescoping spacer bars pivotally secured to said rigid frame at one end and adapted to be pivotally secured to a towing vehicle at the opposite end, and an auxiliary grab hook secured to each spacer bar, said flexible connecting chains or cables being adapted to be secured between said auxiliary grab hooks and the undercarriage of the wreck.

9. The apparatus defined in claim 1 and including rigid spacing means pivotally secured to said side members of said frame and adapted to be pivotally secured to the towing vehicle.

10. The apparatus defined in claim 1 and including a pair of rigid spacer bars, each having one end pivotally secured to one of said side members of said frame and each having its other end pivotally secured to a towing vehicle.

References Cited by the Examiner

UNITED STATES PATENTS 1,254,804  1/1918  Holmes.
2,833,430  5/1958  Collins _____ 214—86
3,019,033  1/1962  Wegener et al. _____ 214—86 X GERALD M. FORLENZA, *Primary Examiner.*

A. J. MAKAY, *Assistant Examiner.*